(12) United States Patent
Ellermann et al.

(10) Patent No.: US 9,470,589 B2
(45) Date of Patent: Oct. 18, 2016

(54) DEVICE FOR DETECTING THE STATE OF A MACHINE ELEMENT

(71) Applicant: CLAAS SELBSTFAHRENDE ERNTEMASCHINEN GMBH, Harsewinkel (DE)

(72) Inventors: Klaus Ellermann, Lage (DE); Goetz Daehne, Berlin (DE)

(73) Assignee: CLAAS Selbstfahrende Erntemaschinen GmbH, Harsewinkel (DE)

(*) Notice: Subject to any disclaimer, the term of this patent is extended or adjusted under 35 U.S.C. 154(b) by 0 days.

(21) Appl. No.: 14/590,221

(22) Filed: Jan. 6, 2015

(65) Prior Publication Data

US 2015/0192484 A1    Jul. 9, 2015

(30) Foreign Application Priority Data

Jan. 8, 2014    (DE) .................... 10 2014 100 124

(51) Int. Cl.
| | |
|---|---|
| *G01L 3/02* | (2006.01) |
| *G01L 3/08* | (2006.01) |
| *G01L 5/00* | (2006.01) |
| *G01P 3/36* | (2006.01) |
| *G01L 3/06* | (2006.01) |

(52) U.S. Cl.
CPC . *G01L 3/08* (2013.01); *G01L 3/06* (2013.01); *G01L 5/0061* (2013.01); *G01P 3/36* (2013.01)

(58) Field of Classification Search
CPC ......... G01L 3/08; G01L 3/06; G01L 5/0061; G01P 3/36

USPC ...................... 73/862.192, 862.324
See application file for complete search history.

(56) References Cited

U.S. PATENT DOCUMENTS

| 3,666,021 | A | * | 5/1972 | Whitehouse | ............ B25B 23/14 |
|---|---|---|---|---|---|
| | | | | | 173/180 |
| 5,195,721 | A | * | 3/1993 | Akkerman | ............ F16D 27/105 |
| | | | | | 192/56.1 |
| 5,351,039 | A | * | 9/1994 | Oketani | ................ B23Q 11/04 |
| | | | | | 340/680 |
| 5,508,609 | A | * | 4/1996 | Parkinson | ................ G01B 7/02 |
| | | | | | 324/207.24 |
| 2002/0124663 | A1 | * | 9/2002 | Tokumoto | ................ B62D 6/10 |
| | | | | | 73/862.333 |
| 2006/0114117 | A1 | * | 6/2006 | Matsuhashi | ........ B23Q 17/0909 |
| | | | | | 340/680 |
| 2008/0194339 | A1 | * | 8/2008 | Antchak | ................ F16D 7/022 |
| | | | | | 464/40 |

FOREIGN PATENT DOCUMENTS

DE             3708103        10/1987

* cited by examiner

*Primary Examiner* — Max Noori
(74) *Attorney, Agent, or Firm* — Michael J. Striker

(57) ABSTRACT

A device for detecting a mechanical state of a machine element rotates about an axis, such as a shaft is formed with an actuator disposed on the machine element so as to be axially movable, an arrangement for converting a torsion of the machine element into an axial displacement of the actuator and a sensor disposed so as to be stationary relative to the machine element for detecting the axial displacement of the actuator. A mark is assigned to the actuator for detection by the sensor in order to detect the axial displacement of the actuator. A speed (n) of the machine element can be determined from the number of marks that are detected per unit of time.

16 Claims, 1 Drawing Sheet

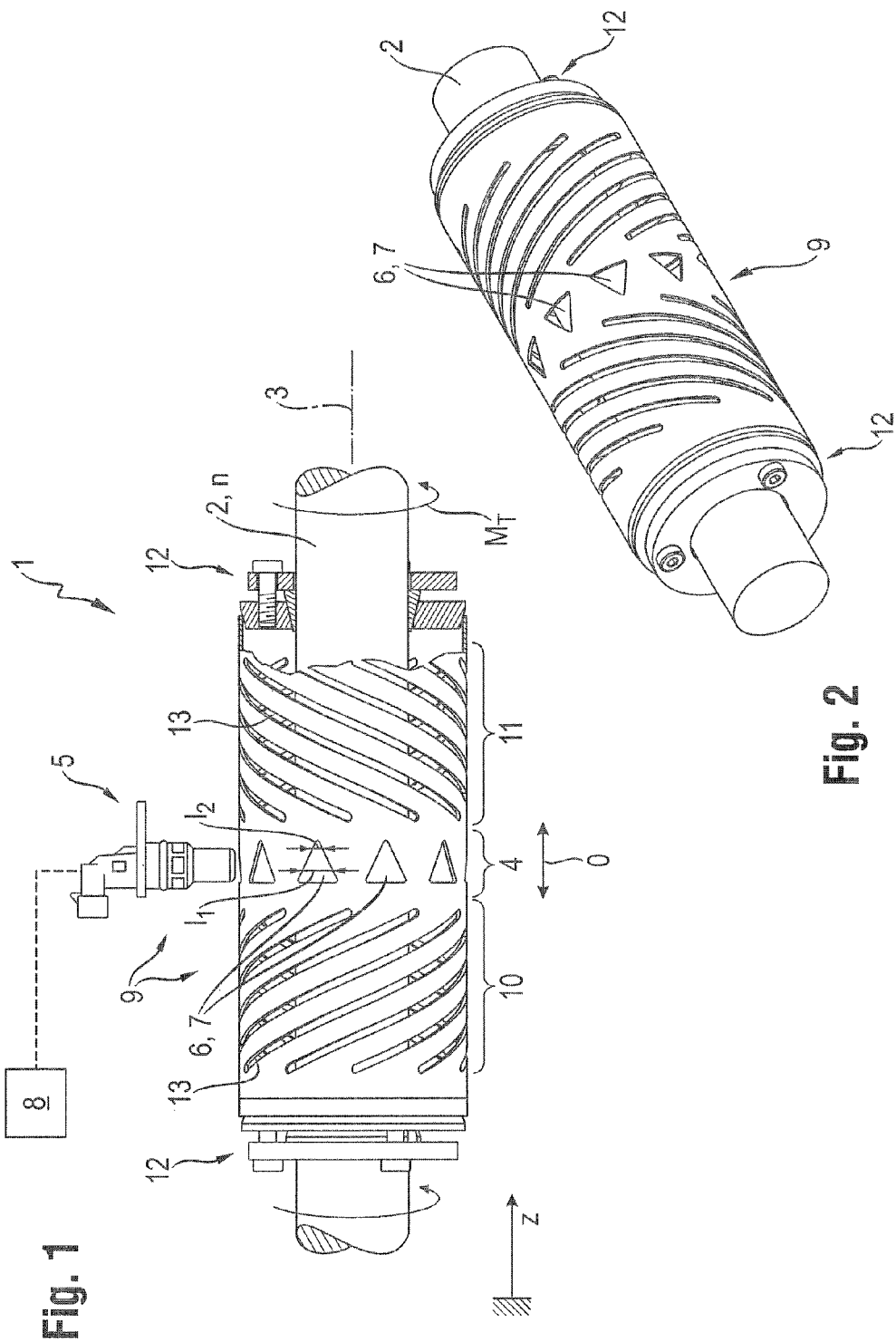

DEVICE FOR DETECTING THE STATE OF A MACHINE ELEMENT

CROSS-REFERENCE TO A RELATED APPLICATION

The invention described and claimed hereinbelow is also described in German Patent Application DE 10 2014 100 124.9, filed on Jan. 8, 2014. The German Patent Application, the subject matter of which is incorporated herein by reference, provides the basis for a claim of priority of invention under 35 U.S.C. 119(a)-(d).

BACKGROUND OF THE INVENTION

The present invention relates to a device for detecting the mechanical state of a machine element that can rotate about an axis.

Agricultural working machines, such as tractors, harvesting machines, attachments and the like, utilize rotatable machine elements, in particular, (drive) shafts in highly diverse application forms in order to drive highly diverse assemblies and, very generally, in order to transfer mechanical drive power between these assemblies. In this connection there is often a need, depending on the particular application, to detect the torque transferred by the machine element (a shaft, in particular), as is the case in other fields of mechanical engineering.

As known, this can take place by detecting the torsion of the machine element itself. Torsion, which is the elastic twisting of the machine element, can be used to calculate a torsional moment that is acting on the machine element, provided the material properties and geometry of the machine-element are known. In the case of a shaft, for example, this approach can be used to determine the torque that is transmitted by the shaft, the magnitude of which corresponds to the torsional moment acting on the machine element.

The torsion of a rotating machine element can be detected, in principle, by a stationary sensor arrangement that very exactly determines the respective angle of rotation of the machine element at two regions of the machine element that are spaced axially apart from one another. The torsion of the machine element is determined by simultaneously comparing the angles of rotation in the spaced-apart regions. The disadvantage of this method is the amount of outlay that is required, in terms of installation space and costs, to detect the angle of rotation at two points that are spaced apart from one another. In addition, performing an exact measurement at relatively high rotational speeds is either not possible or requires considerably complex measurement technology.

It also is possible to detect the torque transferred by the machine element by measuring torsion at the rotating machine element, for example, using strain gauges that are suitably disposed for this purpose. A disadvantage of this type of detection, however, is the difficulty of transmitting the measurement signal from the rotating measurement point correctly and without interference.

Moreover, reference is made to DE 37 08 103 A1 with regard to another type of torque determination. FIG. 7 therein shows, for example, a device for detecting the torsion of a shaft. To this end, an annular actuator is disposed on the shaft so as to be axially displaceable and is connected at both ends by an elastic helical structure at each end (said helical structures turning in opposing directions), to regions of the shaft that are spaced axially apart from one another.

A torsion of the shaft caused by a torque transferred by the shaft results in a displacement of the centrally disposed actuator in the axial direction. The displacement increases as the torsion increases and decreases as the torsion decreases, and therefore, the extent of the displacement of the actuator can be considered to be a measure of the torsion. Using a sensor, e.g., inductive detection of the displacement of the actuator, it is possible to determine the torsion of the shaft and a torque that is transferred by the shaft in this manner.

For numerous control/regulating processes on agricultural machines, it is often desirable in practical applications to know not only the torque that is transferred by a machine element, but also the speed thereof. Speed is typically determined using a separate sensor system (speed sensor). This requires installation space and, due to the measurement technology that is required, generates costs that are not inconsequential.

SUMMARY OF THE INVENTION

The present invention overcomes the shortcomings of known arts, such as those mentioned above, by providing a device for detecting the mechanical state of a rotatable machine element, with which the torque and speed of the machine element is determined and which has a relatively compact design and low structural complexity.

In an embodiment, the device for detecting the mechanical state of a machine element that can rotate about an axis, such as a shaft, comprises an actuator disposed on the machine element to be axially movable, means for converting a torsion of the machine element into an axial displacement of the actuator and a sensor disposed so as to be stationary relative to the machine element, for detecting the axial displacement of the actuator. A mark is assigned to the actuator and the mark is detected by the sensor in order to detect the axial displacement of the actuator. A speed of the machine element is determined from the number of marks that are detected per unit of time.

According to the Invention, it was recognized that not only the torque of the machine element but also the speed thereof can be detected using structurally simple means. Specifically, when a mark is assigned to the actuator, the axial displacement of the mark is detected in order to determine the torsion of the machine element. The mark is detected by this sensor and also additionally allows speed to be determined. The mark can be, in principle, any type of identification that can be detected by the sensor for the purpose of determining speed. To this end, the mark is conveniently located on a circumferential region of the actuator.

Such an arrangement makes it possible to derive not only information regarding the axial displacement of the actuator, but also information regarding the speed of the machine element from the measurement signal that is generated by the sensor. If a mark is assigned to the actuator on a circumferential region, for example, this is detected by the sensor exactly once with every full revolution of the machine element. A reciprocal value of the time period for one full revolution, which will be calculated, therefore corresponds to the speed of the machine element.

It is conceivable that not only a mark as described above, but also a plurality of marks that are distributed over the circumference is assigned to the actuator. A relatively large number of marks results in shorter and more frequent measurement intervals and thereby makes it possible to increase the accuracy of the measurement, in particular when speeds are relatively slow.

According to an embodiment, the mark is preferably designed such that the axial displacement of the actuator as well as the speed of the machine element can be determined from the measurement signals of the sensor. In other words, the mark is designed such that it is possible to derive two types of information therefrom, namely the torsion (corresponding to the axial displacement of the actuator) and the speed of the machine element (corresponding to the frequency of detected marks). This can be implemented in technically different manners.

In an embodiment, a mark is formed by a feature that is assigned to the actuator and detected using a sensor. The feature can have different designs, in principle, in order to permit suitable detection, for example, being formed by an optically detectable surface design of the actuator (e.g., a triangular recess and/or a colored design of the surface of the actuator), a magnetization of the actuator at least in some regions and/or by any other physically detectable design. Contactless detection principles are preferably used in this case in order to prevent frictional losses. The sensor is conveniently a sensor that is suitable for the detection of the respective feature, such as an optical, magnetic, capacitive and/or electrical sensor. Various possibilities for detection are conceivable, provided it is ensured that the axial displacement of the actuator as well as the speed of the machine element can be detected.

This feature is conveniently formed on a circumferential surface of the actuator and has a circumferential extension that tapers relative to an axial direction such that a measurement signal that is generated when the sensor is passed, in particular the time duration thereof, provides information regarding the axial displacement of the actuator. Preferably, the feature has a shape such that the time duration of the measurement signal is approximately proportional to a torsion of the machine element. In other words, a suitable shape of the feature can therefore compensate for a non-linear axial displacement of the actuator. Such a shape can be achieved, for example, using a recess formed on the actuator and/or any other superficially active features.

In an embodiment, the displacement of the actuator is determined using so-called speckle interferometry. To this end, the surface of the actuator is scanned with laser light, for example, in order to detect an axial displacement of the actuator on the basis of changes in light reflections on the rough surface of the actuator.

In order to ensure that usable information is derived from the measurement signals that can be generated, a computer device is advantageously provided that is operated to determine a torsional moment acting on the machine element and, therefore, the torque that is transferred by the machine element, from the time duration of the measurement signal.

In addition or alternatively thereto, a computer device is advantageously provided that can be operated to determine the speed of the machine element from the number of detected measurement signals.

In an embodiment, the aforementioned computer device is operated to determine the mechanical power transmitted by the machine element by multiplying the determined torsional moment and the determined speed of the machine element. In this case, the inventive device is a particularly compact power measurement device which determines the speed, torque and transmitted power of a machine element using only one sensor.

From a structural perspective, it is possible to use various means for converting a torsion of the machine element into an axial displacement of the actuator. In one development, the actuator is designed as a hollow body, in particular as a hollow shaft body and/or an annular body, through which the machine element is guided. The actuator is connected to the machine element by an elastic helical structure. The elastic helical structure is implemented in the form of a coil spring in the simplest case and carries out the desired conversion of a torsion of the machine element into an axial displacement of the actuator.

Since this conversion takes place purely mechanically, no external energy supply is necessary. Moreover, an axial deflection that is relatively great and, therefore, easily detected by sensors, is achieved even when torsion is relatively low. This is possible since the helical shape serves to amplify the rotational movement (torsion) into a translational movement (axial displacement), provided that the pitch of the helix is relatively low. In a broader sense, a knee joint effect takes place. Advantageously, the actuator and the elastic helical structure are designed as a common hollow body.

In an embodiment, the actuator is connected, in a first axial direction, to the machine element via a left-handed elastic helical structure and is connected to the machine element in a second axial direction, which is opposed to the first axial direction, via a right-handed elastic helical structure. In this case, the actuator is connected to the machine element at both ends via helical structures that turn in opposing directions, thereby resulting in a reaction behavior that is particularly accurate and is symmetrical (i.e., is similarly acting in both load directions).

The aforementioned device can be used for rotatable machine elements such as shafts, for example, in different regions of the machine. Such uses are advantageous in that the torque that is transmitted by the machine element as well as the speed thereof is determined with a particularly compact design and only a single sensor.

The invention also relates to an agricultural working machine, in particular, a vehicle, an attachment, a harvesting machine or the like, which is equipped with a device as described above. Machine elements within the meaning of this description are preferably considered to be power-transmitting, rotatable components such as shafts in particular.

BRIEF DESCRIPTION OF THE DRAWINGS

Further features and advantages of the invention will become apparent from the description of embodiments that follows, with reference to the attached figures, wherein:

FIG. 1: shows a simplified illustration of an exemplary embodiment of a device according to the invention, in a side view, and FIG. 2 shows a part of the device shown in FIG. 1, in a perspective view.

DETAILED DESCRIPTION OF THE PREFERRED EMBODIMENTS

The following is a detailed description of example embodiments of the invention depicted in the accompanying drawings. The example embodiments are presented in such detail as to clearly communicate the Invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

FIG. 1 shows a device 1 for detecting the mechanical state of a continuous shaft 2 according to an exemplary embodiment of the invention, in a side view. Shaft 2 rotates about an axis 3 in order to transmit mechanical drive power between machine components, which are not illustrated here. This can be, for example, a shaft within a drive train (e.g., the ground drive) of an agricultural working machine.

In its rotating state, when the shaft 2 is driven directly or Indirectly by a drive motor, the shaft rotates at a speed n about the axis 3. When the shaft 2 is used to drive a further machine component, for example, a vehicle wheel (or any other consumer) that is used to propel a vehicle, the shaft 2 is in a mechanically loaded state since the shaft transmits a torque which, in turn, reacts on the shaft 2 as torsional moment (MT). The torsional moment (MT) induces an elastic twisting, i.e., a torsion, of the shaft 2 about the axis 3. Since an elastic torsion of the shaft 2 is proportional to the torsional moment (MT), it is possible to determine the torsional moment (MT) and, therefore, the torque that is transferred by the shaft 2, by measuring the torsion of the shaft 2. This principle is utilized by the device 1 according to the following.

The device 1 comprises means 9, 10, 11, 12 for converting a torsion of the shaft 2 into an axial displacement of an actuator 4, which can move axially on the shaft 2. To this end, a rotationally fixed fastening 12 is disposed on the shaft 2 at each of two regions of the shaft 2 that are spaced axially apart from one another. A hollow body in the form of a hollow shaft 9 extends between these two fastenings 12, wherein the hollow shaft is connected to the shaft 2 by one of the fastenings 12 at each end of the hollow shaft. The shaft 2 is guided through the hollow shaft 9, wherein the hollow shaft 9 has an Inner diameter, at least in a central region, which is at least slightly larger than an outer diameter of the shaft 2 at this point such that this central region does not have contact with the circumferential surface of the shaft 2.

The hollow shaft 9 is divided into a plurality of sections in an axial direction z. The hollow shaft 9 is connected to the shaft 2 in a rotationally fixed manner at the respective end sections by the fastenings 12. Sections 10, 4, 11 of the hollow shaft 9 are located between the fastenings and are spaced apart from the shaft 2 due to the larger inner diameter of the hollow shaft 9. The sections 10, 4, 11 can therefore move axially relative to the shaft 2.

A central section of the hollow shaft 9 is formed by an annular actuator 4, which adjoins an elastic helical structure 10, 11 at both ends and is retained thereby. Each of the elastic helical structures 10, 11 is connected, at the end thereof that faces away from the actuator 4, to the shaft 2 by a fastening 12.

As should be apparent in FIG. 1, the actuator 4 and the elastic helical structures 10, 11 are designed as a common hollow body (hollow shaft 9). In this connection, an elastic helical structure 10, 11 is formed by forming a plurality of elongated recesses 13 in the initially dosed circumferential surface of the hollow shaft 9 in the applicable section. The recesses 13 extend parallel to one another but form an acute angle with respect to the axial direction z. The material webs that remain between the recesses 13 then have a helical (or "spiral") course relative to the axis 3. The helical structures 10 and 11 turn in opposing directions. Relative to the axial direction z, which is indicated, the actuator 4 is connected to the shaft 2 via a left-handed, elastic helical structure 11. In the opposite axial direction ("−z"), the actuator 4 is connected to the shaft 2 via a right-handed, elastic helical structure 10.

Each of the helical structures 10, 11 acts on the axially movable actuator 4 in the manner of a plurality of coil springs that are connected in parallel. The two fastenings 12 located at the ends of the hollow body 9 twist relative to one another even when a relatively small torsion of the shaft 2 occurs. Depending on the direction and the extent of this twisting, the opposing helical structures 10, 11, which are connected to one another via the actuator 4, bring about an axial displacement of the movable actuator 4. It is therefore possible to read the direction and extent of the torsion of the shaft 2 from the direction (zero position indicated with "0") and the extent of the axial displacement of the actuator 4.

For this purpose, the device 1 also comprises a sensor 5, which is disposed to as to be stationary. This can be any type of sensor, in principle, that is suitable for the application to be described, for example, an optical sensor (e.g., laser), a capacitive sensor, an electrical sensor, a magnetic sensor or the like. In the embodiment shown, the sensor 5 a magnetic sensor. The sensor 5 is suitable for detecting an axial displacement of the actuator 4, which corresponds to the torsional moment (MT) acting on the shaft 2 due to the aforementioned mechanical interrelationships. The sensor 5 is also suitable for detecting a speed n of the shaft 2. In order to make this possible, a particular type of marks 6 that can be detected by the sensor 5 is assigned to the actuator 4.

For example, the actuator 4 is provided with a plurality of marks 6, which are distributed over the circumference thereof at regular intervals. A mark 6 is provided with a particular shape such that the axial displacement of the actuator 4 as well as the speed n of the shaft 2 is determined from the measurement signals of the scanning sensor 5. In the example shown, a mark 6 is formed in each case by an approximately triangular material recess 7 in the circumferential surface of the hollow body 9.

The recess 7 (as shown) has the basic shape of an Isosceles triangle (which is "bulged" when considering the curvature), the base of which extends in a radial plane relative to the axis 3. The recess 7 therefore has a circumferential extension I that tapers relative to the axial direction z. This is illustrated in FIG. 1 by the dimensions I1 and I2, wherein the circumferential extension I of the recesses 7 reduces from a larger value I1 to a relatively smaller value I2 as the axial direction z increases.

The effect of this design of the recess 7 is that a measurement signal that is generated when a mark 6 or a recess 7 passes by the sensor 5 during the revolution of the shaft 2 has different time durations. The time duration of the measurement signal of the sensor 5 that is generated when a mark 6 passes by therefore provides information as to whether, to what extent, and in which direction an axial displacement of the actuator 4 has taken place. Due to the special shape of the mark 6, it is therefore possible to deduce the extent of the torsion of the shaft 2 from the time duration of the measurement signal.

Various shapes of the recesses 7 are conceivable. The shape, for example, can be configured such that the time duration of the measurement signal is approximately proportional to a torsion of the machine element. In this case, the shape of the recess 7 could advantageously compensate for a potential non-linearity of the axial displacement of the actuator 4.

A computer device 8, which is supplied with measurement signals by the sensor 5, is used to determine the torsional moment (MT). This computer device is operated to determine a torsional moment (MT) acting on the shaft 2 from the time duration of the measurement signal.

The computer device 8 also is operated to determine the speed n of the shaft 2 from the number of measurement signals per unit of time that are detected by the sensor 5. According to the Invention, the torsional moment (MT) as well as the speed n of the shaft 2 can be determined using the one (only) sensor 5 of the device 1.

The computer device 8 also can carry out a multiplication of the torsional moment (MT) and the speed n of the shaft 2 in order to determine the mechanical power transmitted via the shaft 2. In this case, the device 1 can therefore be used as a power sensor.

A part of the device 1 that was described above with reference to FIG. 1, specifically in which the sensor 5 is omitted, is depicted in a perspective view in FIG. 2. As shown, the shaft 2, with the hollow shaft 9 fastened thereon, is assembled to form a relatively compact and robust assembly. The shaft 2 is practically not weakened by the presence of the enclosing hollow shaft 9. The fastenings 12 can be shrunk-fit onto the shaft 2, for example.

LIST OF REFERENCE CHARACTERS 1 device
2 shaft
3 axis
4 actuator
5 sensor
6 mark
7 recess
8 computer
9 hollow shaft
10 right-handed helix
11 left-handed helix
12 fastening
13 elongated recess
I1, I2 circumferential extension
n speed
MT torsional moment As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A device for detecting the mechanical state of a machine element that rotates about an axis, comprising:
   an actuator disposed on the machine element so as to be axially movable;
   means for converting a torsion of the machine element into an axial displacement of the actuator; and
   a sensor disposed so as to be stationary relative to the machine element for detecting the axial displacement of the actuator;
   wherein a mark is provided on the actuator and detected by the sensor to detect the axial displacement of the actuator; and
   wherein a speed (n) of the machine element is determined from a number of mark detections per unit of time by the sensor.

2. The device according to claim 1, wherein mark is designed such that the axial displacement of the actuator as well as the speed (n) of the machine element is determined from measurement signals generated by the sensor.

3. The device according to claim 1, wherein a plurality of marks are provided on and distributed over a circumference of the actuator.

4. The device according to claim 1, where the mark is formed by a feature that is provided on the actuator for detection by the sensor in a form of an optically detectable surface design, by a magnetization of the actuator that is detectable at least in some regions or by any other type of physically detectable properties of the actuator.

5. The device according to claim 4, wherein the feature is formed on a circumferential surface of the actuator and has a circumferential extension (I) that tapers with respect to an axial direction (z) such that a time duration of a measurement signal generated by the sensor provides information about the axial displacement of the actuator.

6. The device according to claim 5, wherein the feature has a shape such that the time duration of the measurement signal is approximately proportional to a torsion of the machine element.

7. The device according to claim 2, further comprising a computer device that determines a torsional moment (MT) acting on the machine element from one of the measurement signals.

8. The device according to claim 7, wherein the computer device determines the torsional moment (MT) acting on the machine element from one of the measurement signals representing a time duration of the torsional moment (MT).

9. The device according to claim 2, further comprising a computer device that determines the speed (n) of the machine element from the a number of the measurement signals that are detected per unit of time.

10. The device according to claim 7, wherein the computer device determines a mechanical power transmitted by the machine element via multiplication of the torsional moment (MT) and the speed (n) of the machine element.

11. The device according to claim 1, wherein the actuator is designed as a hollow shaft body, an annular body or both, through which the machine element is guided; and wherein the actuator is connected to the machine element by an elastic helical structure.

12. The device according to claim 11, wherein the actuator and the elastic helical structure are designed as a common hollow body.

13. The device according to claim 1, wherein the actuator is connected, in a first axial direction (z), to the machine element via a left-handed elastic helical structure and is connected to the machine element, in a second axial direction (-z), which is opposed to the first axial direction, via a right-handed elastic helical structure.

14. An agricultural working a vehicle comprising a device according to claim 1.

15. An agricultural working attachment comprising a device according to claim 1.

16. An agricultural harvesting machine comprising a device according to claim 1.

* * * * *